US007289026B2

(12) United States Patent
Hackstadt et al.

(10) Patent No.: US 7,289,026 B2
(45) Date of Patent: Oct. 30, 2007

(54) METHOD AND SYSTEM FOR GATHERING DATA FROM RFID TAGS ON LIBRARY ITEMS AND TRANSMITTING THAT DATA TO THE ACTIVE FOCUS OF AN APPLICATION

(75) Inventors: Raleigh Scott Hackstadt, Roswell, GA (US); David Allen Denton, Sugar Hill, GA (US)

(73) Assignee: Vernon Library Supplies, Inc., Norcross, GA (US)

( * ) Notice: Subject to any disclaimer, the term of this patent is extended or adjusted under 35 U.S.C. 154(b) by 295 days.

(21) Appl. No.: 11/113,625

(22) Filed: Apr. 25, 2005

(65) Prior Publication Data

US 2005/0258964 A1    Nov. 24, 2005

Related U.S. Application Data

(60) Provisional application No. 60/565,004, filed on Apr. 23, 2004.

(51) Int. Cl.
*G08B 13/14* (2006.01)

(52) U.S. Cl. .................................. 340/572.1; 235/385
(58) Field of Classification Search ............. 340/572.1, 340/572.4, 5.92; 235/385
See application file for complete search history.

(56) References Cited

U.S. PATENT DOCUMENTS

| 4,141,078 | A | * | 2/1979 | Bridges et al. ............. 235/375 |
| 4,510,490 | A | * | 4/1985 | Anderson et al. ......... 340/572.1 |
| 5,777,884 | A | * | 7/1998 | Belka et al. ................. 700/225 |
| 5,963,134 | A | * | 10/1999 | Bowers et al. ........... 340/572.1 |
| 6,693,539 | B2 | * | 2/2004 | Bowers et al. ........... 340/572.1 |

* cited by examiner

*Primary Examiner*—John Tweel, Jr.

(57) ABSTRACT

This invention relates generally to the use of radio frequency identification (RFID) in libraries. More specifically, this invention relates to a system and method of handling the inventory of materials available for check-out in a library by making the checkout procedure more efficient by using RFID technology to gather data from RFID tags on library items and transmit that data to the active focus of an application.

13 Claims, 1 Drawing Sheet

METHOD AND SYSTEM FOR GATHERING DATA FROM RFID TAGS ON LIBRARY ITEMS AND TRANSMITTING THAT DATA TO THE ACTIVE FOCUS OF AN APPLICATION

RELATED APPLICATIONS

U.S. Provisional Patent Application No. 60/565,004, filed Apr. 23, 2004, which is hereby incorporated by reference as if set forth fully herein.

FIELD OF THE INVENTION

This invention relates generally to the use of radio frequency identification (RFID) in libraries. More specifically, this invention relates to a system and method of handling the inventory of materials available for check-out in a library by making the checkout procedure more efficient by using RFID technology to gather data from RFID tags on library items and transmit that data to the active focus of an application.

DESCRIPTION OF THE RELATED ART

Prior to the introduction of RFID, most libraries used an identification system that was primarily bar code based. In these prior systems, each item in a given library's collection was assigned an item identification number. This number corresponds to an item record in a database that also contains information such as the author, title, category and other relevant information about the item. Commonly, the printed bar code is physically affixed to each item. The attached bar code generally displays a printed eye-readable version of the item identification number, as well as the scannable lines comprising the code. The bar code is affixed to the item so that when an optical bar code scanner scans or reads the bar code, the number can be transmitted directly to the keyboard port of the computer utilizing a split ended keyboard cable. In this way, when a bar code is scanned for a given item, the data is received into the computer and displayed on the monitor in a similar fashion as if it was manually typed in on the keyboard. Indeed, the same result could be obtained by manually typing the item identification number into the correct field of the given application and pressing the appropriate action key.

Most libraries incorporate software made by any number of specialty software vendors, which require keyboard entry or bar code scanning for item identification number entry. These applications that allow libraries to process materials, check items in and out, track due dates, and much more are designed to accommodate the entry of item numbers via one or more text based entry fields. The main disadvantage to these prior art systems is the fact that the text cursor must always be located in the correct field, when the correct item number is entered by keying it in or by bar code scanning, for the desired action to occur in conjunction with that item record as identified within the library software.

Many libraries have recently become aware of the benefits of utilizing RFID tags in the place of or in conjunction with bar code labels. These RFID tags can store the item identification number as well as any other useful information about the item. A main advantage of RFID tags is that they may be read without an optical scanner or line of sight to the RFID tag. The item need only be placed over an RFID antenna and the information stored on the tag is quickly read. In addition to speed and ease of use, an additional feature that makes the RFID tag advantageous to educational and commercial environments is the ability to utilize part of the tag for electronic article surveillance (EAS) security purposes.

A main disadvantage to the usage of RFID reader systems in a commercial or educational environment is that the RFID reader systems can transmit information only into a specially adapted application which communicates with the RFID reader via a two-way communication cable such as a parallel or serial cable. The application must be specifically designed to handle information read by the particular model of RFID reader. Thus, customized software becomes necessary which is unaffordable for most libraries and other educational environments who operate on extremely limited budgets.

Many prior art systems use an add-on communication application that allows the data to be transmitted directly to the database of the library application thereby bypassing the usable interface of the library application. This method is inferior because the computer user loses the ability to utilize the feature rich environment of the library application to which he/she is accustomed.

The prior art methods are more cumbersome for the computer user and require considerable new learning. Moreover, the interface between the RFID data gathering application and the data receiving application must be configured in a manner specific to and coordinated between each of the manufacturer's applications. It is thereby more difficult to customize and configure as well as more prone to error.

Other implementations of RFID have required the elaborate means of constructing a custom communication protocol to allow the RFID application and the library application to exchange data. These methods require that the RFID software and the library software both be customized to allow for this interchange. While some standardization has occurred with these communications protocols (SIP or Standard Interchange Protocol for instance), there are considerable variations among library software applications and a complex degree of customization and configuration is required to implement this communication protocol. Additionally, the required software customization increases the likelihood of error in data entry. A further problem with prior art systems, is that the methods used required the computer users to use a special screen interface with which they were not familiar. Also, many of these customized systems did not allow full or easy access to other features of their existing library software.

SUMMARY OF THE INVENTION

The present invention solves these problems associated with transmitting an item identification number from a RFID tagged item gathered by an RFID reader and its software interface into nearly any existing library application. The invention's method of doing this is much simpler and less expensive than the other prior art methods. It is also less prone to error and easier to configure and use. Most importantly, it does not require users of existing library applications to work outside of their existing full-featured software environment.

A primary concern of the present invention is to overcome the disadvantages inherent with the addition of specialized software by utilizing a system and method of storing and retrieving information from RFID tags which are operable with existing data entry software applications so that no additional customized data handling software is required to be purchased by the institution.

Specifically, the problem addressed by the present invention is how to transmit the item identification number from the RFID tags after being read by the RFID reader into existing software applications. In essence, the item identification number is read from the RFID tag and gathered by a special application into the computer memory managed by a custom RFID supporting application. However, in prior art systems there is no means of transmitting data from the RFID application to the data entry software application without the customization of the existing software or purchase of a complete new software package.

The current invention has advantages over the prior art in that it works with virtually any existing library application regardless of manufacturer, with little or no customization. It does not require that the computer user work outside of his or her familiar and feature rich library application, and in fact the RFID control software allows the computer user to utilize any library application by entering the RFID data in the exact same active text input box with which he or she is already familiar.

This invention addresses a means of sending the information read from an RFID reader into another application that does not require replacement or customization of the existing software application. The present invention does not require the alteration of the existing library application, and works with nearly any library application by virtue of its methodology, i.e. it sends the data into the existing application in the primary format the existing application was designed to accept data.

DETAILED DESCRIPTION

Figure 1:
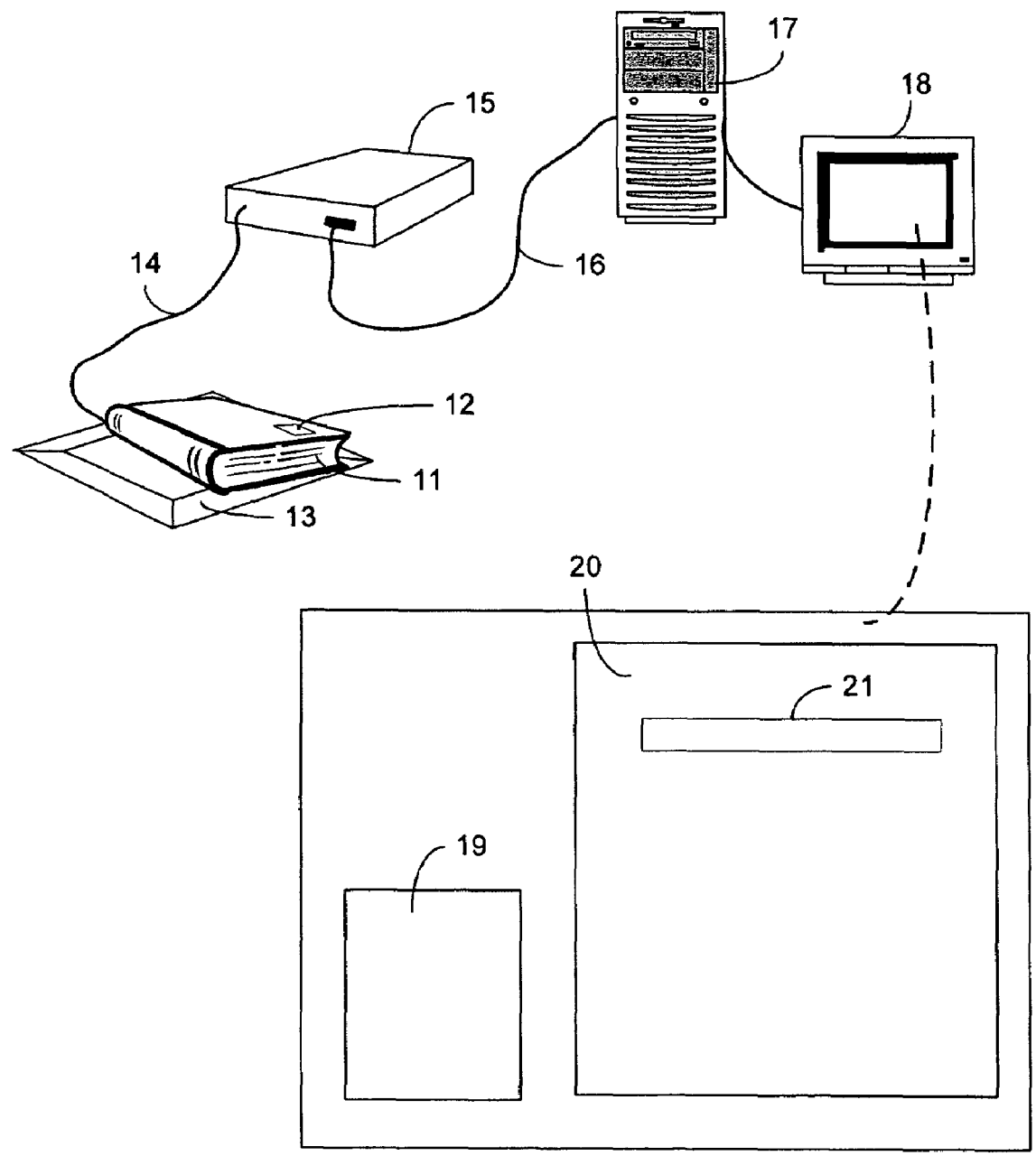
FIG. 1 shows the components needed to read the data from an RFID tag and transmit all or any part thereof to an active text input box in a user interface of a second application.

It is to be understood that the invention is not limited in its application to the details of construction and the arrangement of components set forth in the following description or illustrated in the drawings.

The active text input box 21 can be any text input box in any application that currently has the focus or in which the text cursor resides at a given time. The text cursor is that position or field in a Windows application where text will appear whenever data is entered via the keyboard attached to the computer. When there are many input fields in a given application, only one field has the focus or is actively ready to receive data entered via the keyboard. It is that active field which is called the focus and to which we refer to as the active text input box 21.

In an exemplary embodiment, identification information corresponding to a piece of library material available for checkout is stored on an RFID tag 12. The RFID tag 12 is attached to library material 11. In this example, the library material 11 is a book, but it could be any piece of library media such as a book, a CD, a DVD, an audio tape, a video tape, a software collection, or any item desired to be catalogued.

The method by which the RFID tag 12 is attached to the library material 11 is normally by an adhesive backing but the method may vary based on the manufacturer of the RFID tag 12 and the type of library material 11 which the RFID tag 12 is to be attached to. In an exemplary embodiment of the present invention, the RFID tag 12 may be affixed to the library material 11 on the inside cover of the material 11 so that it does no obstruct the outer cover which is viewed by the library browser.

The size, shape, orientation and other properties of RFID tags also may vary among manufacturers of RFID tags. Identification information corresponding to the library material 11 is written to the RFID tag 12. Normally, an individual RFID tag 12 would be affixed to each individual item of library material 11 in the library's collection and data written to each RFID tag 12 so affixed. In an exemplary embodiment the identification information uniquely identifies each library material 11 from all other material in the library collection.

In an exemplary embodiment of the present invention, identification information is stored on the RFID tag 12 through bar code scanning techniques or manual input. Commonly, the identification information will correspond to a unique database number corresponding to the library's inventory system. In alternative embodiments, the identification information may further include the material type, ownership information, and shelf location. Such identification information may be stored in the format of a number or a string of characters.

An RFID antenna 13 is used to read the data stored on the RFID tag 12 affixed to library material 11. In an alternative embodiment, the RFID antenna 13 may be a group of one or more antennae. The sizes and shapes of the RFID antennae vary among manufacturers. Generally, these RFID antennae emit a localized usable field, such that the library material 11 with RFID tag 12 must be placed in close proximity to the RFID antenna 13 in order that the data may be read from the RFID tag 12. Thus in an exemplary embodiment of the present invention the RFID antenna would be located at the location where a library patron checks-out the library material 11 and presents her library card.

In an exemplary embodiment of the present invention the RFID antenna 13 may be placed under the protection of the library check-out area countertop. Typical models of RFID antennae 13 have the capability to read RFID tags 12 through plastic and wood, and thus may be placed out of sight from the library patron and in an area where it does not unnecessarily take up counter space.

An RFID coupler 15 is connected to the RFID antenna 13 via the antenna cable 14. The RFID coupler 15 is an electronic processor for decoding the data stored on the RFID tag 12. The RFID coupler 15 also may supply power to the RFID antenna 13. In alternative embodiments of the present invention, the circuitry for the RFID coupler 15 can be enclosed in the same housing as the RFID antenna 13.

A data cable 16 connects the RFID coupler 15 to a computer 17. The means by which the data cable 16 attaches to the computer 17 varies among manufacturers of RFID equipment. Normally, the data cable 16 attaches to the computer 17 via a bi-directional communication port, for example, a serial, parallel or USB port. In some cases, the computer 17 supplies power to the RFID coupler 15 via the serial, parallel, USB or a via separate keyboard connection that supplies power only. Other models receive their power directly from a standard wall outlet.

In the preferred embodiment, the computer 17 is a standard personal computer that may utilize any of the Microsoft Windows operating systems used by library staff. A standard computer monitor 18 displays the user interface for the programs running on the computer 17. A library application 20 represents any software that is running on computer 17 that has an active text input box 21 available for the entry of data. Normally this library application 20 will make use of an internal database that contains a record for each item in the library's collection. Each record is usually accessed by an item identification number that is associated with the record. The item identification number is usually one part of the data stored on the RFID tag 12 that serves as a unique identifier for each library material 11.

In the preferred embodiment, a library clerk runs or starts the library application 20 as normal. The operator also initializes the RFID control software 19 and sets it into the appropriate mode for reading and transmitting information from RFID tags. In this example, a patron comes to the desk with library material 11 to checkout. After entering the patron's identification number as is normal within the library application 20, the operator takes the presented library material 11 and sets up the library application 20 in the manner that is normal for checkout, by placing the cursor into the item checkout field. This item checkout field then becomes the active text input box 21.

The library material 11 contains a previously affixed RFID tag 12 that stores an encoded version of the item identification number that corresponds to the library material 11. The operator places the library material 11 in a position so that the RFID tag 12 may be read by the RFID antenna 13. Once the RFID tag 12 is within the active field produced by the RFID antenna 13, the stored data is extracted from the RFID tag 12 by the RFID coupler 15 via the antenna cable 14 and the RFID antenna 13.

The RFID control software 19 is running on computer 17 and is constantly polling or interrogating the RFID coupler 15 for any new tag data that has been read. It communicates with the RFID coupler 15 via the data cable 16. When the RFID coupler 15 has extracted the required information from the RFID tag 12, it sends this data to the RFID control software application 19. The RFID control software 19 parses the data into fields defined by the system, and further decodes the data to isolate the required information.

The RFID control software 19 then sends the information to the active text input box 21 via for example, a Windows system command. The library application 20 subsequently reacts as it normally would when the required information is entered into the active text input box 21. An example would be to react to facilitate item checkout by associating the identification information with the patron's library account. It is important to note that the RFID control software 19 is still looking for more RFID tags, and in most cases the library application 20 still has the text cursor or focus in the active text input box 21 that was already selected. In this way, subsequent items may be checked out by simply holding subsequent library material 11 in succession over the RFID antenna 13.

As an example, the specific command, identified above, used by the RFID control software 19 to send the data to the active text input box 21, which may be an entirely different application, may be System.Windows.Forms.Sendkeys.Send(x) where x is a text string which represents the item identification number for the library material 11 as extracted from the RFID tag 12. In alternative embodiments, x can also include various control characters, for example a carriage return character. When such control characters are included, they can be added by the RFID control software 19. A carriage return or other suffix may be used to cause the library application 20 to process the data it receives via the active text input box 21 without further input from the library clerk. It should be noted that the present invention is not limited to the use of the above exemplary command, the command may be operating system and programming language specific.

The above example may describe a patron bringing library material 11 for checkout to the circulation desk. A similar process could be used if the patron brought library material 11 to check back in. In most cases, only the position of the text cursor in the library application 20 would need to change. For instance the librarian could click into an item check in field instead of an item checkout field, thus the item check in field would become the active text input box 21.

Using the RFID control software 19 as described herein, the librarian need only use their library application 20 in the way they ordinarily would for any function that requires an item number to be input into a text field. By setting their library application 20 as per normal for any desired function that utilizes the input of an item identification number, they merely need to place the library material 11 with its RFID tag 12 over the active RFID antenna 13.

Many modifications and other embodiments of the inventions set forth herein will come to mind to one skilled in the art to which these inventions pertain having the benefit of the teachings presented in the foregoing descriptions and the associated attachments. Therefore, it is to be understood that the inventions are not to be limited to the specific embodiments disclosed and that modifications and other embodiments are intended to be included within the scope of the present disclosure. Although specific terms are employed herein, they are used in a generic and descriptive sense only and not for purposes of limitation.

We claim:

1. A method of lending materials from a library, comprising:
   storing identification information on an RFID tag;
   attaching the RFID tag with adhesive to material made available for check out from the library;
   gathering said identification information from said RFID tag using an RFID reading device located at a checkout point of the library;
   transmitting said identification information from said RFID reading device to a first application running on a first computer; and
   sending said identification information from said first application into an active text field located on a user interface operated by a second application;
   using said identification information to effectuate the checkout of material from the library.

2. A computer-readable medium having stored thereon computer-executable instructions for performing the method of claim 1.

3. The method of claim 1, wherein the identification information uniquely identifies the material that the corresponding RFID tag is attached to.

4. The method of claim 1, wherein the material may consist of one or more of the group of: software, books, compact discs, digital video discs, audio tapes and video tapes.

5. The method of claim 1, wherein the identification information consists of a pre-determined number corresponding with an inventory system of the library.

6. A system for lending materials from a library, comprising:
   an RFID tag with identification information stored thereon;
   the RFID tag attached to material corresponding to the stored identification information;
   an RFID reading device for reading the identification information from the RFID tag and transmitting the identification information to a first application;

the first application for receiving the identification information from said RFID reading device;

the first application sending the identification information into an active text field in a second application;

the second application using the identification information to effectuate the checkout of material from the library.

7. The system of claim 6, wherein the identification information uniquely identifies the material that the corresponding RFID tag is attached to.

8. The system of claim 6, wherein the material may consist of one or more of the group of: software, books, compact discs, digital video discs, audio tapes and video tapes.

9. The system of claim 6, wherein the identification information consists of a pre-determined number corresponding with an inventory system of the library.

10. A system for lending materials from a library, comprising:

means for storing identification information on an RFID tag;

means for attaching the RFID tag with adhesive to material made available for check out from the library;

means for gathering said identification information from said RFID tag using an RFID reading device located at a checkout point of the library;

means for transmitting said identification information from said RFID reading device to a first application running on a first computer; and means for sending said identification information from said first application into an active text field located on a user interface operated by a second application;

means for using said identification information to effectuate the checkout of material from the library.

11. The system of claim 10, wherein the identification information uniquely identifies the material that the corresponding RFID tag is attached to.

12. The system of claim 10, wherein the material may consist of one or more of the group of: software, books, compact discs, digital video discs, audio tapes and video tapes.

13. The system of claim 10, wherein the identification information consists of a pre-determined number corresponding with an inventory system of the library.

* * * * *